United States Patent [19]

Yeh

[11] Patent Number: 4,802,208

[45] Date of Patent: Jan. 31, 1989

[54] HOT-LINE DEVICE FOR TELEPHONE SETS

[75] Inventor: Kou-I Yeh, Taipei, Taiwan

[73] Assignee: Inventa Electronics Co., Ltd., Taipei, Taiwan

[21] Appl. No.: 51,940

[22] Filed: May 19, 1987

[51] Int. Cl.[4] ............................................. H04M 1/272
[52] U.S. Cl. ...................................... 379/216; 379/51; 379/355
[58] Field of Search ...................... 379/216, 40, 38, 51, 379/69, 355, 356, 357, 57, 52

[56] References Cited

U.S. PATENT DOCUMENTS 3,573,389 4/1971 Greenstein ...................... 379/216 X

FOREIGN PATENT DOCUMENTS 0223946 12/1983 Japan ..................................... 379/355

Primary Examiner—James L. Dwyer
Attorney, Agent, or Firm—Ladas & Parry

[57] ABSTRACT

A hot-line device for telephone sets includes a logic AND gate circuit serving as a central unit with its output to be electrically connected to a control circuit through the keyboard of a telephone set, and its inputs respectively coupled with a hot-line triggering circuit, a dial-tone detection circuit and a ringing detection and delay circuit separately disposed in the telephone set for automatically effecting dialing operation during an emergency situation. Alternatively, the logic AND gate circuit can be replaced with a microprocessor for performing automatic dialing operation through a predetermined program.

7 Claims, 5 Drawing Sheets

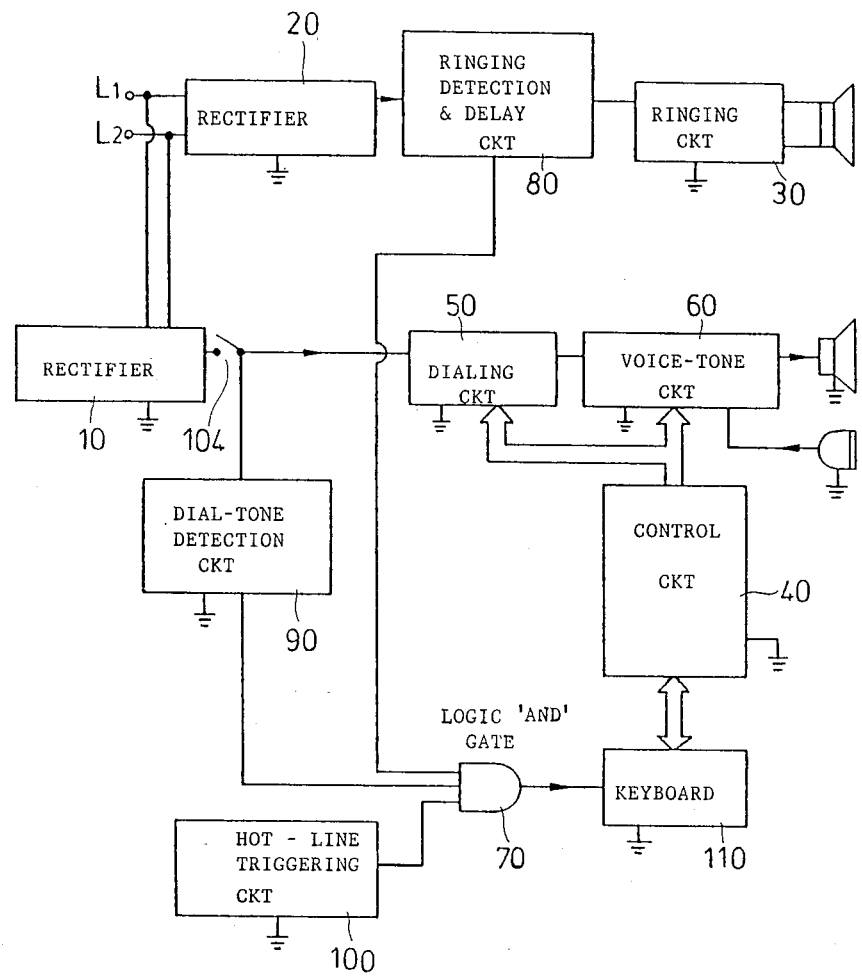
F I G. 1

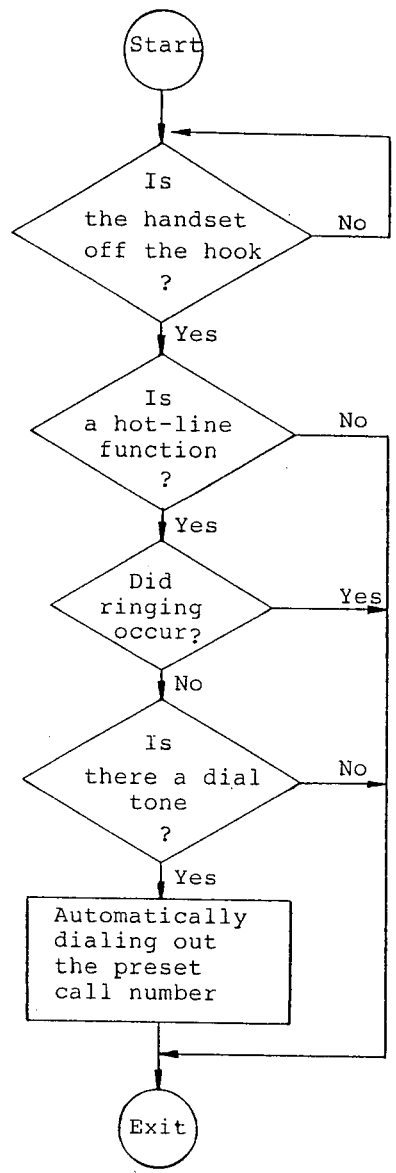
F I G. 5

HOT-LINE DEVICE FOR TELEPHONE SETS

BACKGROUND OF THE INVENTION

This invention relates to a hot-line device for telephone sets, and more particularly to that type of hot-line device electrically disposed in a telephone set for automatic dialing operations during an emergency situation without requiring the user's dialing action.

Following the prosperity of industrial and commercial development, distance between individuals has been reduced to nothing through electrical communications. However, it is of paramount importance to facilitate a system whereby emergency calls can be made most expeditionally. For example, during the emergency of fire, bank robbery, serious illness, etc., because the victim often forgets the emergency call number, the rescue cannot be made in time.

On the other hand, since dialing or push-button action is normally required for making a telephone call using the conventional telephone sets, during an emergency situation, such as robbery, sufficient time for the victim to dial an emergency call number is not available. In this case, if a telephone set is equipped with a hot-line device such as that of this invention, an emergency call can be made instantly simply by picking up the receiver from the telephone set, without requiring dialing operations.

SUMMARY OF THE INVENTION

It is accordingly a primary object of this invention to provide a hot-line device for telephone sets with an automatic dialing function by which the required rescue can be timely obtained in an emergency situation.

This and other objects of the invention are achieved by providing a hot-line device incorporated into a conventional telephone set, which hot-line device comprises a logic AND gate means serving as a central unit with its output connected to a voice-tone circuit through a control circuit and the keyboard of a telephone set and its inputs respectively coupled with a hot-line triggering circuit, a dial-tone detection circuit, and a ringing detection and delay circuit. Alternatively, the logic AND gate means can be replaced with a microprocessor and a program is provided for performing automatic dialing operations. With the hot-line device of this invention provided in the conventional telephone sets, during an emergency situation, emergency call, of which the call number is preset in the telephone set, can be automatically made simply by picking up the handset without requiring dialing operation.

Other advantages and characteristics of this invention will become apparent from the following detailed description of a preferred embodiment when read with reference to the accompanying drawings.

BRIEF DESCRIPTION OF THE DRAWINGS

FIG. 1 is a block diagram of a preferred embodiment of a hot-line incorporated in a telephone set according to this invention;

FIG. 5 is a flowchart of the preferred embodiment of FIG. 4.

DETAILED DESCRIPTION OF THE PREFERRED EMBODIMENT

Figure 2:
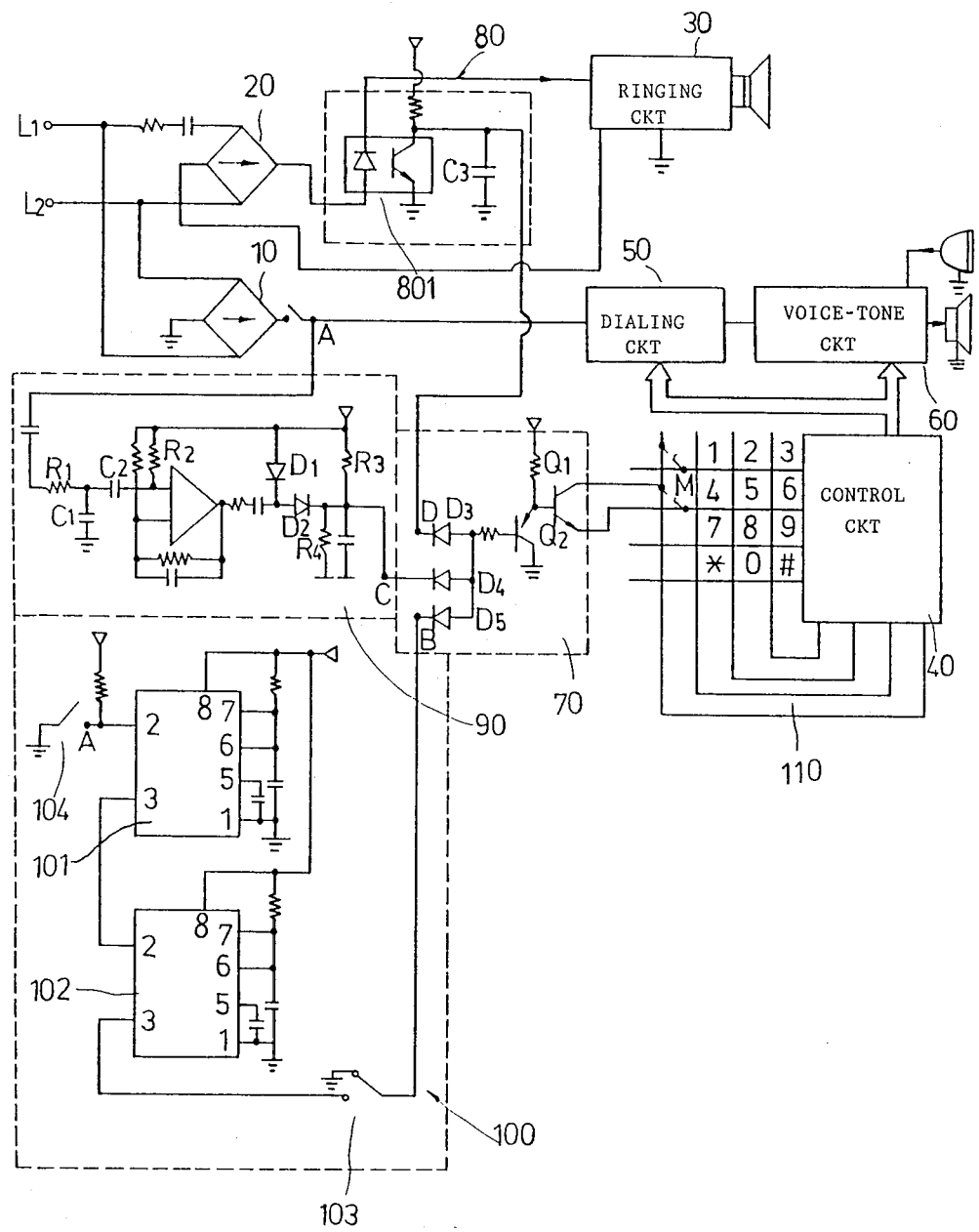
FIG. 2 is a circuit diagram of the preferred embodiment of FIG. 1.

Referring to FIG. 1, there is shown the preferred embodiment of a hot-line device for telephone sets, which, as usual, include: a pair of rectifying circuits 10, 20 separately connected to the telephone lines L1, L2; a ringing circuit 30; a control circuit 40 electrically coupled with a dialing circuit 50 and a voice-tone circuit 60; and a keyboard 110 electrically connected to the control circuit 40. The preferred embodiment of the hot-line device according to this invention comprises a logic AND gate means 70, serving as a central unit, with its output terminated at the keyboard 110 and its inputs separately connected to a ringing detection and delay circuit 80, which is electrically coupled between the rectifying circuit 20 and the ringing circuit 30, a dial-tone detection circuit 90 coupled with the dialing circuit 50, and a hot-line triggering circuit 100.

It may be deemed that, telephone sets equipped with the hot-line device according to this invention could initiate erroneous automatic dialing when the handset is off the hook during a normal call. Therefore, in order to obviate the chance of erroneous automatic dialing, two kinds of hardware configurations are adapted according to this invention: one is a ringing detection and delay circuit 80 by which, when the handset is off the hook upon ringing, no automatic dialing will be effected; another one is a dial-tone detection circuit 90 by which, when the handset is off the hook and a dial tone is detected, automatic dialing will not be performed. Details will be described later herein.

Since memory dialing IC for telephone use is available, an example of using this memory dialing IC is set for explaining the storing principle of a specific call number in a telephone set provided with a hot-line device. As shown in FIG. 2, a memory key M, as usual, is provided in the keyboard 40. When the key M is pressed following the numeral keys of a specific call number to be set in the telephone set such as "911" or other emergency call number, that call number will be stored in the M address of the telephone control IC 40. When the handset is off the hook without incoming call, the call number stored in the M address of the control IC 40 will be automatically dialed out therefrom.

Referring to FIG. 2, which is a circuit diagram of the preferred embodiment of FIG. 1, the hot-line triggering circuit 100 includes a first IC 101 and a second IC 102 (such as NE555) electrically coupled together, wherein a third pin of the second IC 102 is connected to a hot-line selective switch 103 whose other end is connected to an input terminal of the logic AND gate 70, and a second pin of the first IC 101 connected to a hook switch 104 of a telephone set.

The logic AND gate circuit 70 includes a first transistor circuit Q1 and a second transistor circuit Q2 wherein the collector and emitter of Q1 are connected to the keyboard 110 and the control circuit 40, and the base of Q2 is coupled with a third, fourth and fifth diodes D3, D4, D5 wherein the fifth diode D5 is connected to the hot-line selective switch 103, the fourth diode D4 connected to the dial-tone detection circuit 90, and the third diode D3 is connected to the ringing detection and delay circuit 80.

Figure 3:
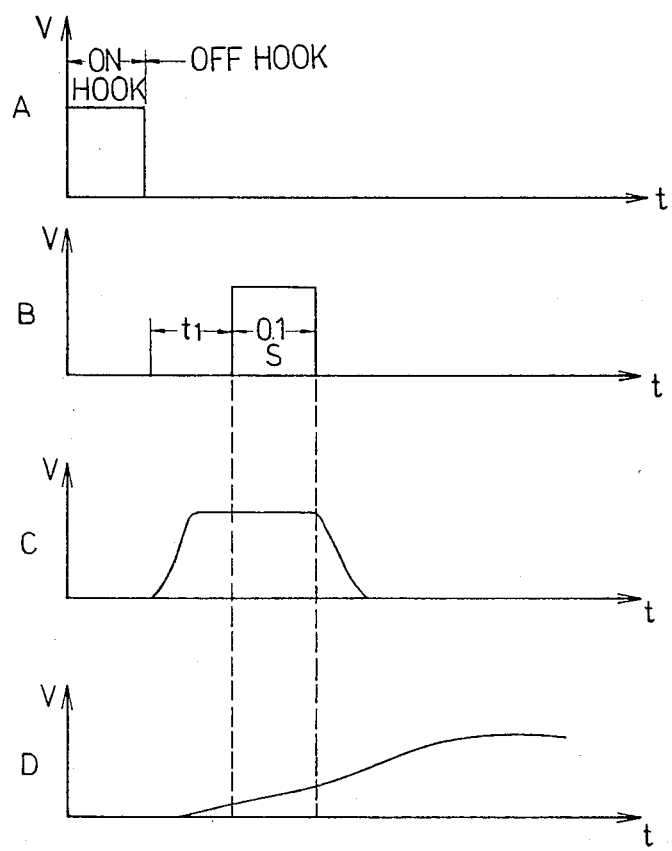
FIG. 3(A, B, C, D) is a time sequential chart indicating the detecting time made at various detecting points shown in FIG. 2.

As shown in FIGS. 2 and 3, if there is no external signal coming in through the telephone lines L1 and L2, the output of both the ringing detection and delay circuit 80 at point D and the dial-tone detection circuit 90 at point C is at a high level, with the hot-line selective switch 103 being kept at a closed condition and the first transistor Q1 being cut off. At this condition, if the handset of the telephone set is picked up, the hook switch 104, which is electrically connected to the first IC 101 of the hot-line triggering circuit 100, will be turned on, causing the potential at point A, as shown in FIG. 3, to drop, and the first transistor Q1 is thus turned on to conduct thereat. The start of conduction of Q1 functions at the same time the memory key M is pressed, and the call number preset in the memory address of the control IC 40 is therefore automatically dialed out therefrom.

In the preferred embodiment shown in FIG. 2, the ringing detection and delay circuit 80 and the dial-tone detection circuit 90 respectively perform their functions so as to ensure that when the telephone handset is off the hook upon an incoming call, no automatic dialing function is effected. Details are as follows:

(1) Concerning the ringing detection and delay circuit 80, as shown in FIG. 2, when incoming call is on the telephone lines L1 and L2, ringing circuit 30 is actuated to ring thereat, and a photo-coupler 801 of the ringing detection and delay circuit 80 is energized to conduct, causing a capacitor C3 of the ringing detection and delay circuit 80 to start discharging thereat. When the handset is off the hook, the capacitor C3 starts charging through the hot-line selective switch 103, which is turned on thereat, as shown in FIG. 3D. Owing to the slow charging action of the capacitor C3, in a pulse duration of 0.1 second as shown in FIG. 3B, the output of the logic AND gate circuit 70 still remains at a low level, and the first transistor Q1 is kept cut off thereat. Therefore, no automatic dialing is effected.

(2) With regard to the dial-tone detection circuit 90, which is mainly composed of a bandpass filter as shown in FIG. 2, the first R-C circuit R1, C1 is designed to block out the output of high frequencies while the second R-C circuit R2, C2 is to block out the input of low frequencies at the input stage thereof. The diodes D1, D2 and the resistors R3, R4 are arranged at the output stage of the dial-tone detection circuit 90 for detecting the peak value of the output thereof. If no incoming call is in process and the telephone handset is off the hook, a dial tone from the telephone lines L1, L2 will be fed into the circuit, and the potential at the output point C will become a high level as shown in FIG. 3C, causing the first transistor Q1 to conduct and resulting in an automatic dialing operation from the control circuit 40. On the other hand, when the handset is off the hook after a incoming call, the potential at point C always remains at a low level and Q1 is also in a cut-off state, and no automatic dialing will be effected.

Figure 4:
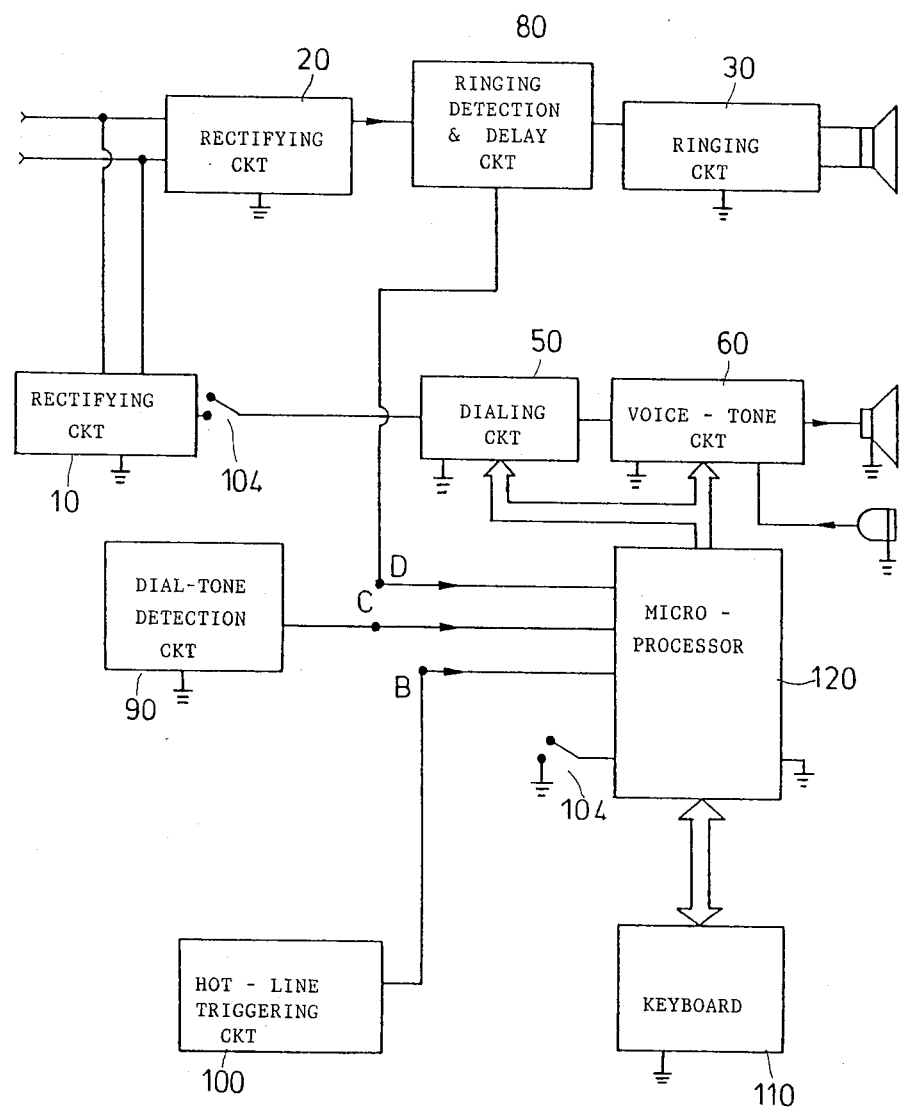
FIG. 4 is a block diagram of an alternative preferred embodiment of a hot-line device incorporated in a telephone set for being operated through a microprocessor and software programs according to this invention.

Referring to FIG. 4 as well as to FIG. 2, there is shown an alternative preferred embodiment of a hot-line device for telephone sets. As clearly shown in the drawings, the logic AND gate circuit 70 and the control circuit 40 in FIG. 2 are replaced by a microprocessor 120. With a software program, as illustratively shown in FIG. 5, the microprocessor 120 can perform the same function as that described and illustrated in the above paragraphs.

As shown in FIGS. 4 and 5, supposing a hot-line function is detected by the microprocessor 120, and a signal from the hook switch 104 indicates that the handset is picked up, the microprocessor 120 will be supplied with the input signals form the ringing detection and delay circuit 80 and the dial-tone detection circuit 90, and the microprocessor 120 will determine whether or not an automatic dialing operation should be effected thereat according to the procedures as shown in FIG. 5.

Having thus described the invention, it is to be understood that many embodiments thereof will suggest themselves without departing from the spirit and scope of the invention. Therefore, it is intended that the specification and drawings be interpreted as illustrative rather than in a limiting sense except as defined in the appended claims.

What is claimed is:

1. A hot-line device for telephone sets having rectifying circuits, a hook switch, a dialing circuit, a ringing circuit, a control circuit, a memory dialing IC for storing a specific call numbers, and a keyboard with a memory key functionally connected to the memory dialing IC, respectively disposed therein comprising:

a logic AND gate means serving as a central unit with its output connected to the control circuit;

a hot line triggering means having its input terminated at the hook switch for detecting the close and open condition thereof, and its output connected to an input of said logic AND gate means for supplying hot-line triggering signals thereto in conjunction with the off and on of the hook switch; and a ringing detection and delay means with its input connected between the rectifying circuit and the ringing circuit and its output connected to one of the inputs of said logic AND gate means for detecting supplying ringing signals thereto; whereby, when the memory key is preset in the keyboard, automatic dialing can be effected upon the telephone handset being picked up during an emergency situation.

2. A hot-line device for telephone sets according to claim 1, further comprising a dial-tone detection means having its input connected to the dialing circuit and its output to the input of said logic AND gate means for detecting dial tone and supplying detected signals to said logic AND gate means.

3. A hot-line device for telephone sets according to claim 2, wherein said logic AND gate means comprises:

a transistor circuit having its output coupled with the control circuit through the keyboard for being energized to effect automatic dialing function therefrom; and a parallel-arranged diode circuit with an output connected to an input of said transistor circuit and a plurality of input terminals respectively coupled with said hot-line triggering means, said dial-tone detection means and said ringing detection and delay means for separately receiving respective detected signals therefrom in effecting automatic dialing operation through the control circuit.

4. A hot-line device for telephone sets according to claim 1, wherein said hot-line triggering means comprises:

a first IC means electrically connected to the telephone hook switch for detecting the on and off condition of the hook switch; a second IC means coupled with said first IC means; and a hot-line selective switch electrically connected between said second IC means and a first input terminal of said logic AND gate means; so that hot-line triggering signals can be accurately supplied to said logic AND gate means to effect automatic dialing function therewith.

5. A hot-line device for telephone sets according to claim 2, wherein said dial-tone detection means comprises:
- a bandpass means with its input circuit coupled with the dialing circuit of a telephone set for blocking out the input of high frequencies, and its output circuit connected to a second input terminal of said logic AND gate means for blocking out the input of low frequencies; and
- a diode circuit coupled between said input and output circuits for detecting a peak value in said bandpass means so as to supply correctly detected dial-tone signal to said logic AND gate means upon the telephone handset being picked up and to effect automatic dialing operation during an emergency situation.

6. A hot-line device for telephone sets according to claim 3, wherein said ringing detection and delay means comprising a photo-coupler means electrically coupled between the ringing circuit of a telephone set and one of the input terminals of said parallel-arranged diode circuit of said logic AND gate means, and a capacitor electrically connected to said photo-coupler for performing charging and discharging along with the energization of said photo-coupler so that a delayed ringing signal can be supplied to said logic AND gate means for effecting automatic dialing operation during an emergency situation.

7. A hot-line device for telephone sets having rectifying circuits, a hook switch, a ringing circuit, a control circuit, with a memory dialing IC for storing a specific call numbers, and a keyboard with a memory key functionally connected to the memory dialing IC, respectively disposed therein comprising:
- a microprocessor serving as a central unit with its output connected to the control circuit;
- a hot line triggering means having its input terminated at the hook switch for detecting the close and open condition thereof, and its output connected to an input of said microprocessor for supplying hot-line triggering signals thereto in conjunction with the off and on of the hook switch; and a ringing detection and delay means with its input connected between the rectifying circuit and the ringing circuit and its output connected to the inputs of said microprocessor for detecting and supplying ringing signals thereto; whereby, when the memory key is preset in the keyboard, automatic dialing can be effected upon the telephone handset being picked up during an emergency situation.

* * * * *